(12) United States Patent
Marks

(10) Patent No.: US 9,395,955 B2
(45) Date of Patent: Jul. 19, 2016

(54) PROGRAMMING SYSTEM AND METHOD

(71) Applicant: Jayarama Marks, Austin, TX (US)

(72) Inventor: Jayarama Marks, Austin, TX (US)

( * ) Notice: Subject to any disclaimer, the term of this patent is extended or adjusted under 35 U.S.C. 154(b) by 60 days.

(21) Appl. No.: 14/217,731

(22) Filed: Mar. 18, 2014

(65) Prior Publication Data

US 2014/0317597 A1    Oct. 23, 2014

Related U.S. Application Data

(60) Provisional application No. 61/802,939, filed on Mar. 18, 2013.

(51) Int. Cl.
*G06F 9/44* (2006.01)

(52) U.S. Cl.
CPC ... *G06F 8/30* (2013.01); *G06F 8/34* (2013.01); *G06F 9/4443* (2013.01)

(58) Field of Classification Search
CPC .......................................................... G06F 8/30
USPC .......................................................... 717/109
See application file for complete search history.

(56) References Cited

U.S. PATENT DOCUMENTS

| | | | |
|---|---|---|---|
| 5,450,529 A | 9/1995 | Bigus | |
| 5,583,964 A | 12/1996 | Wang | |
| 6,463,438 B1 | 10/2002 | Veltri et al. | |
| 6,697,707 B2 | 2/2004 | Peters, II | |
| 7,506,302 B2 | 3/2009 | Bahrami | |
| 7,599,896 B2 | 10/2009 | Peters, II | |
| 8,195,504 B2 | 6/2012 | Merrifield, Jr. et al. | |
| 2001/0053991 A1 | 12/2001 | Bonabeau | |
| 2002/0143720 A1 | 10/2002 | Anderson et al. | |
| 2004/0153796 A1 | 8/2004 | Honkanen | |
| 2005/0075994 A1 | 4/2005 | Heh | |
| 2005/0091435 A1 | 4/2005 | Han et al. | |
| 2005/0257194 A1* | 11/2005 | Morrow et al. | 717/109 |
| 2006/0150148 A1* | 7/2006 | Beckett et al. | 717/109 |
| 2006/0294500 A1* | 12/2006 | Chiang | 717/109 |
| 2008/0059436 A1* | 3/2008 | Crocker | 707/3 |

(Continued)

FOREIGN PATENT DOCUMENTS

| | | |
|---|---|---|
| WO | WO0026822 A1 | 5/2000 |
| WO | WO2011090883 A2 | 7/2011 |

*Primary Examiner* — John Chavis
(74) *Attorney, Agent, or Firm* — JP Webb; Jason P. Webb; Danny Y. H. Cheng

(57) ABSTRACT

A programming system and method configured to facilitate the programming of computer programs and interfacing therewith including a computing system. The computing system includes a processing module having a processor. The computing system includes a memory storage module having a memory device functionally coupled to the processor. The computing system includes a plurality of real-time collaborative computing modules stored in the memory device and functionally coupled to the processor, wherein each collaborative computing module includes a function and a plurality of state characteristics stored in memory. The computing system includes a plurality of connection strand modules stored in the memory storage module and functionally coupled to the processing module, wherein each is configured to functionally couple collaborative computing modules together and to automatically operate on a first subset of the plurality of state characteristics according to a first predefined rule set.

18 Claims, 10 Drawing Sheets

(56) References Cited

U.S. PATENT DOCUMENTS

| | | |
|---|---|---|
| 2008/0300946 A1 | 12/2008 | Clark et al. |
| 2009/0083637 A1 | 3/2009 | Skakkebaek et al. |
| 2009/0094329 A1 | 4/2009 | Ambati et al. |
| 2009/0192845 A1 | 7/2009 | Gudipaty et al. |
| 2011/0072414 A1* | 3/2011 | Gardner ......................... 717/109 |
| 2011/0209117 A1* | 8/2011 | Agustin et al. ................ 717/109 |
| 2013/0191809 A1* | 7/2013 | Lovitt ........................... 717/109 |
| 2014/0196006 A1* | 7/2014 | Eldridge et al. .............. 717/109 |

\* cited by examiner

| Buffer | Updates every | In Seconds | In Minutes | In Hours | In Days | In Years |
|---|---|---|---|---|---|---|
| 0 | 500 m s | | | | | |
| 1 | 1 s | 1 s | | | | |
| 2 | 2 s | 2 s | | | | |
| 3 | 4 s | 4 s | | | | |
| 4 | 8 s | 8 s | | | | |
| 5 | 16 s | 16 s | | | | |
| 6 | 32 s | 32 s | | | | |
| 7 | 1 mins | 64 s | 1 mins | | | |
| 8 | 2 mins | 128 s | 2 mins | | | |
| 9 | 4 mins | 256 s | 4 mins | | | |
| 10 | 8 mins | 512 s | 8 mins | | | |
| 11 | 17 mins | 1,024 s | 17 mins | | | |
| 12 | 34 mins | 2,048 s | 34 mins | | | |
| 13 | 1 hrs | 4,096 s | 68 mins | 1 hrs | | |
| 14 | 2 hrs | 8,192 s | 136 mins | 2 hrs | | |
| 15 | 4 hrs | 16,384 s | 273 mins | 4 hrs | | |
| 16 | 9 hrs | 32,768 s | 546 mins | 9 hrs | | |
| 17 | 18 hrs | 65,536 s | 1,092 mins | 18 hrs | | |
| 18 | 24 hrs | 131,072 s | 2,184 mins | 36 hrs | 1 days | |
| 19 | 3 days | 262,144 s | 4,369 mins | 72 hrs | 3 days | |
| 20 | 6 days | 524,288 s | 8,738 mins | 145 hrs | 6 days | |
| 21 | 12 days | 1,048,576 s | 17,476 mins | 291 hrs | 12 days | |
| 22 | 24 days | 2,097,152 s | 34,952 mins | 582 hrs | 24 days | |
| 23 | 48 days | 4,194,304 s | 69,905 mins | 1,165 hrs | 48 days | |
| 24 | 97 days | 8,388,608 s | 139,810 mins | 2,330 hrs | 97 days | |
| 25 | 194 days | 16,777,216 s | 279,620 mins | 4,660 hrs | 194 days | |
| 26 | 1 yrs | 33,554,432 s | 559,240 mins | 9,320 hrs | 388 days | 1 yrs |

FIG. 7A

| Buffer | Updates every | In Seconds | In Minutes | In Hours | In Days | In Years |
|---|---|---|---|---|---|---|
| 27 | 2 yrs | 67,108,864 s | 1,118,481 mins | 18,641 hrs | 776 days | 2 yrs |
| 28 | 4 yrs | 134,217,728 s | 2,236,962 mins | 37,282 hrs | 1,553 days | 4 yrs |
| 29 | 8 yrs | 268,435,456 s | 4,473,924 mins | 74,565 hrs | 3,106 days | 8 yrs |
| 30 | 17 yrs | 536,870,912 s | 8,947,848 mins | 149,130 hrs | 6,213 days | 17 yrs |
| 31 | 34 yrs | 1,073,741,824 s | 17,895,697 mins | 298,261 hrs | 12,427 days | 34 yrs |
| 32 | 68 yrs | 2,147,483,648 s | 35,791,394 mins | 596,523 hrs | 24,855 days | 68 yrs |
| 33 | 136 yrs | 4,294,967,296 s | 71,582,788 mins | 1,193,046 hrs | 49,710 days | 136 yrs |
| 34 | 272 yrs | 8,589,934,592 s | 143,165,576 mins | 2,386,092 hrs | 99,420 days | 272 yrs |
| 35 | 544 yrs | 17179,869,184 s | 286,331,153 mins | 4,772,185 hrs | 198,841 days | 544 yrs |
| 36 | 1,088 yrs | 34,359,738,368 s | 572,662,306 mins | 9,544,371 hrs | 397,682 days | 1,088 yrs |
| 37 | 2,177 yrs | 68,719,476,736 s | 1,145,324,612 mins | 19,088,743 hrs | 795,364 days | 2,177 yrs |
| 38 | 4,355 yrs | 137,438,953,472 s | 2,290,649,224 mins | 38,177,487 hrs | 1,590,728 days | 4,355 yrs |
| 39 | 8,710 yrs | 274,877,906,944 s | 4,581,298,448 mins | 76,354,974 hrs | 3,181,457 days | 8,710 yrs |

FIG. 7B

| t=0s | t=1000yrs. | t=1000yrs. + 0.5s | t=1000yrs. + 1.0s | t=1000yrs. + 1.5s |
|---|---|---|---|---|
| 0: [creation (x=0)]<br>1: [ ]<br>2: [ ]<br>3: [ ]<br>4: [ ]<br>. . .<br>36: [ ]<br>37: [ ]<br>38: [ ]<br>39: [ ] | 0: [ ]<br>1: [ ]<br>2: [ ]<br>3: [ ]<br>4: [ ]<br>. . .<br>36: [creation(x=0)]<br>37: [ ]<br>38: [ ]<br>39: [ ] | 0: [x=387]<br>1: [ ]<br>2: [ ]<br>3: [ ]<br>4: [ ]<br>. . .<br>36: [creation(x=0)]<br>37: [ ]<br>38: [ ]<br>39: [ ] | 0: [x=745]<br>1: [x=387]<br>2: [ ]<br>3: [ ]<br>4: [ ]<br>. . .<br>36: [creation(x=0)]<br>37: [ ]<br>38: [ ]<br>39: [ ] | 0: [x=1026]<br>1: [x=745]<br>2: [ ]<br>3: [ ]<br>4: [ ]<br>. . .<br>36: [creation(x=0)]<br>37: [ ]<br>38: [ ]<br>39: [ ] |
| Full snapshot added to buffer 0 (not just x) | Buffer 35 moved to buffer 36 about 544 years ago. | You started moving it within the last 500ms; now the atom is at x=387 | Buffer 0 moves down every 0.5s; now the atom is at x=745 | Buffer 0 moves down every 0.5s; now the atom is at x=1026. No change from this point on. |

FIG. 7C

| t=100yrs + 2.0s | t=100yrs + 2.5s | t=1000yrs. + 3.0s | t=1000yrs. + 3.5s | t=1000yrs. + 4.0s |
|---|---|---|---|---|
| 0: [] <br> 1: [x=1026] <br> 2: [x=745] <br> 3: [] <br> 4: [] <br> ... <br> 36: [] <br> 37: [] <br> 38: [] <br> 39: [] | 0: [] <br> 1: [x=1026] <br> 2: [x=745] <br> 3: [] <br> 4: [] <br> ... <br> 36: [creation(x=0)] <br> 37: [] <br> 38: [] <br> 39: [] | 0: [] <br> 1: [] <br> 2: [x=1026] <br> 3: [] <br> 4: [] <br> ... <br> 36: [creation(x=0)] <br> 37: [] <br> 38: [] <br> 39: [] | 0: [] <br> 1: [] <br> 2: [x=1026] <br> 3: [] <br> 4: [] <br> ... <br> 36: [creation(x=0)] <br> 37: [] <br> 38: [] <br> 39: [] | 0: [] <br> 1: [] <br> 2: [] <br> 3: [x=1026] <br> 4: [] <br> ... <br> 36: [creation(x=0)] <br> 37: [] <br> 38: [] <br> 39: [] |
| Buffer 1 moves down every 1.0s; Buffer 2 moves every 2.0s, but it was empty. | Empty buffers inherit the nearest value below them, so buffer 0 doesn't overwrite buffer 1. | Buffer 1 moves down every 1.0s | The buffer says: "2s to 4s ago, x changed from 0 to 1026" | Buffer 2 movesdown every 2.0s: so: "4s to 8s ago, x changed....." |

FIG. 7D

PROGRAMMING SYSTEM AND METHOD

CROSS-REFERENCE TO RELATED APPLICATIONS

This invention claims priority, under 35 U.S.C. §120, to the U.S. Provisional Patent Application No. 61/802,939 by Jayarama Marks filed on Mar. 18, 2013, which is incorporated by reference herein.

BACKGROUND OF THE INVENTION

1. Field of the Invention

The present invention relates to computing and programming systems, methods, input/output devices, programming environments, and computing systems and methods, and specifically, the same associated with programmable computing units.

2. Description of the Related Art

Computer programming or programming is the comprehensive process that leads from an original formulation of a computing problem to executable programs. It involves activities such as analysis, understanding, and generically solving such problems resulting in an algorithm, verification of requirements of the algorithm including its correctness and its resource consumption, implementation (or coding) of the algorithm in a target programming language, testing, debugging, and maintaining the source code, implementation of the build system and management of derived artefacts such as machine code of computer programs. The algorithm is often only represented in human-parseable form and reasoned about using logic (coding). Code is written in one or more programming languages (such as C++, C#, Java, Python, Smalltalk, JavaScript, etc.). Generally, a purpose of programming is to create a sequence of instructions that will automate performing a specific task or solve a given problem. The process of programming thus often requires expertise in many different subjects, including knowledge of the application domain, specialized algorithms and formal logic.

Some improvements have been made in the field. Examples of references related to the present invention are described below in their own words, and the supporting teachings of each reference are incorporated by reference herein:

U.S. Pat. No. 5,450,529, issued to Bigus, discloses a neural network shell has a defined interface to an application program. By interfacing with the neural network shell, any application program becomes a neural network application program. The neural network shell contains a set of utility programs that transfers data into and out of a neural network data structure. This set of utility programs allows an application program to define a new neural network model, create a neural network data structure, train a neural network, and run a neural network. Once trained, the neural network data structure can be transported to other computer systems or to application programs written in different computing languages running on similar or different computer systems.

U.S. Pat. No. 8,195,504, issued to Merrifield Jr., et al., discloses methods, systems, and computer program products for linking service level expectations to performing entities. Embodiments of the invention facilitate an express, measured relationship between each entity and the performance of a corresponding business capability. Thus, when an entity or layer changes, the impact to the performance can be asserted, and later validated through the specific measures. Schematized links for entities and/or business layers can be used to connect to a service level expectation schema to appropriately define how entities and/or business layers contribute to the performance of a business capability.

U.S. Pat. No. 7,599,896, issued to Peters II, discloses an architecture for robot intelligence enables a robot to learn new behaviors and create new behavior sequences autonomously and interact with a dynamically changing environment. Sensory information is mapped onto a Sensory Ego-Sphere (SES) that rapidly identifies important changes in the environment and functions much like short term memory. Behaviors are stored in a DBAM that creates an active map from the robot's current state to a goal state and functions much like long term memory. A dream state converts recent activities stored in the SES and creates or modifies behaviors in the DBAM.

U.S. Pat. No. 7,506,302, issued to Bahrami, discloses a method for providing closed-loop analysis of a business process includes using modeling objects to extend a modeling language to obtain a representation language. The representation language is used to obtain at least one model of the process. The model is implemented using at least one of simulation, project management analysis, workflow analysis and computer-aided software engineering. The method allows a variety of COTS products to be integrated into a single tool for process modeling and closed-loop analysis of business processes.

U.S. Patent Application Publication No.: 2011/0289034, by Palmer et al., discloses methods, apparatus, and articles of manufacture for neural-based processing. In one aspect, there is provided a method. The method may include reading, from a first memory, context information stored based on at least one connection value; reading, from a second memory, an activation value matching the at least one connection value; sending, by a first processor, the context information and the activation value to at least one of a plurality of microengines to configure the at least one microengine as a neuron; and generating, at the at least one microengine, a value representative of an output of the neuron. Related apparatus, systems, methods, and articles are also described.

The inventions heretofore known suffer from a number of disadvantages, including but not limited to not being versatile, not being interactive, being limited in how an end user can interact with data, not permitting a system to simulate biological/electrical/neurological/physical/etc. processes, not providing intelligent memory, failing to permit massive parallel processing, not facilitating reversion in time of data structures, being difficult to program, requiring extensive programming knowledge to program, and the like.

What is needed is a programming system and method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available programming systems and methods. Accordingly, the present invention has been developed to provide computing and programming systems, methods, input/output devices, programming environments, and computing systems and methods, and specifically, the same associated with programmable computing units.

According to one embodiment of the invention, there is a programming system configured to facilitate the programming of computer programs. The programming system may include a computing system. The computing system may include a processing module that may have a processor. The computing system may include a memory storage module that may have a memory device that may be functionally coupled to the processor. The computing system may include a plurality of collaborative computing modules that may be stored in the memory device and may be functionally coupled to the processor, wherein each collaborative computing module may include a function and a plurality of state characteristics stored in memory. The computing system may include a plurality of connection strand modules that may be stored in the memory storage module and may be functionally coupled to the processing module, wherein each may be configured to functionally couple collaborative computing modules together and to automatically operate on a first subset of the plurality of state characteristics according to a first predefined rule set. The computing system may include a physics engine module that may be stored in the memory storage module and may be functionally coupled to the processing module, wherein the physics engine module automatically operates on a second subset of the plurality of state characteristics of the plurality of collaborative computing modules according to a second predefined rule set.

The programming system may include a display device, that may have a display module which displays on the display device the plurality of collaborative computing units in a visual representation according to a third subset of the plurality of state characteristics. The programming system may include a graphical user interface device, that may have an input module, configured to permit a user to manipulate the plurality of collaborative computing units and the plurality of connection strand modules within the computing system such that effective positions of collaborative computing units and connections therebetween may be determined by a user, thereby facilitating programming of the same.

The first subset, the second subset and the third subset may all include overlapping characteristics. The escalating refresh periods of the array of state memory buffers may be related according to a logarithmic scale. The second predefined rule set may include a rule biasing position of collaborative computing modules towards a point along an axis displayed on the display device. The second predefined rule set may include a rule biasing position of collaborative computing modules in favor of a preferred length of a connecting strand module coupling such collaborative computing modules. The function may be selected from the group of functions consisting of: storing information, performing a Boolean operation, transmitting information, comparing information, changing an internal state characteristic, changing a state characteristic of another collaborative computing module, changing a state characteristic of a connection strand module, creating a collaborative computing module, creating a connection strand module, and changing a characteristic of a physics engine module.

The programming system may include a change in one of the second subset of state characteristics modifies operation of a function of at least one of the collaborative computing modules. The plurality of state characteristics may include a characteristic from the group of characteristics consisting of: a time period utilized by a function, a unique identifier of a collaborative computing module, a unique identifier of a connection strand module, an active/inactive toggle value, and a data value utilized by a function.

The collaborative computing modules may also include an array of state memory buffers having escalating refresh periods that progressively store a history of state characteristics of the associated collaborative computing unit. The programming system may include a reversion module that may be configured to select a memory buffer level from the array of state memory buffers and cause a plurality of collaborative computing units to revert to the state characteristics stored at that memory buffer level. The plurality of connection strand modules may transmit data between connected collaborative computing modules. The third subset of characteristics may be an n-dimensional Hilbert space mapped to a set of functions, displayed by the display device and operated upon by the physics engine module.

The display device may update its graphical representation of the plurality of collaborative computing units in real-time, such as but not limited to when a state characteristic of the third subset of the plurality of state characteristics is changed. The physics engine module and/or one or more connection strand modules may operate in real-time.

According to one embodiment of the invention, there is a non-transitory, tangible computer readable storage medium including executable instructions for a collaborative computing module, that may include a function, an array of state memory buffers that may have escalating refresh periods that progressively store a history of state characteristics of the associated collaborative computing unit, and a plurality of state characteristics stored in memory.

According to one embodiment of the invention, there is an input/output device, that may include a collaborative computing module, including a function, an array of state memory buffers having escalating refresh periods that progressively store a history of state characteristics of the associated collaborative computing unit, and a plurality of state characteristics stored in a memory device, wherein the plurality of state characteristics controls operation of the input-output device. The device may include a connection strand module that may be functionally coupled to the collaborative computing module and may be configured to functionally couple the collaborative computing module to a computing system.

According to one embodiment of the invention, there is a system of computing over a network. The system may include a plurality of collaborative computing modules that may be stored in a plurality of memory devices over a network and may be functionally coupled to a plurality of processors over a network. Each collaborative computing module may include a function, an array of state memory buffers that may have escalating refresh periods that progressively store a history of state characteristics of the associated collaborative computing unit, and a plurality of state characteristics stored in memory.

The system may include a plurality of connection strand modules that may be functionally coupled to the plurality of collaborative computing modules, wherein each may be configured to functionally couple collaborative computing modules together and to automatically operate on a first subset of the plurality of state characteristics according to a first predefined rule set. The system may include a physics engine module that may be functionally coupled to the plurality of collaborative computing modules that automatically operates on a second subset of the plurality of state characteristics of the plurality of collaborative computing modules according to a second predefined rule set. The system may include a display device, that may include a display module which may display on the display device the plurality of collaborative computing units in a visual representation according to a third subset of the plurality of state characteristics, wherein the third subset of characteristics may be an n-dimensional Hilbert space mapped to a set of functions, displayed by the display device and operated upon by the physics engine module.

According to one embodiment of the invention, there is a computing system that may include a processing module that may have a processor. The computing system may include a memory storage module that may have a memory device that may be functionally coupled to the processor. The computing system may include a plurality of collaborative computing modules that may be stored in the memory device and may be functionally coupled to the processor. Each collaborative computing module may include a function and a plurality of state characteristics stored in memory.

The computing system may include a plurality of connection strand modules that may be stored in the memory storage module and may be functionally coupled to the processing module. Each may be configured to functionally couple collaborative computing modules together and to automatically operate on a first subset of the plurality of state characteristics according to a first predefined rule set. The computing system may include a physics engine module that may be stored in the memory storage module and may be functionally coupled to the processing module, wherein the physics engine module may automatically operate on a second subset of the plurality of state characteristics of the plurality of collaborative computing modules according to a second predefined rule set.

According to one embodiment of the invention, there is a method of computing that may include the step of recording a first state characteristic value of a plurality of state characteristics of a collaborative computing module in a progressive array of non-transitory, tangible memory buffers, wherein the collaborative computing module includes a function and a plurality of state characteristics stored in memory. The method may include modifying the first state characteristic, wherein the modified state characteristic changes operation of the function. The method may include the step of automatically changing, by operation of a processor in cooperation with a display device, a graphical representation of the collaborative computing module according to the modification of its state characteristic. The method may also include the step of recording the modified state characteristic in the progressive array of non-transitory, tangible memory buffers.

The method may include the step of modifying the first state characteristic occurs automatically as a consequence of at least one of coupling a connection strand module to the collaborative computing module, operation of a physics engine module on the collaborative computing module, and a user, through operation of an input device, selectably altering an intended graphical representation of the collaborative computing module.

According to one embodiment of the invention, there is a method of programming that may include the step of generating a first collaborative computing module within a computing system, wherein the collaborative computing module may include a function and a plurality of state characteristics stored in memory. The method may include the step of generating a second collaborative computing module within the computing system, wherein the collaborative computing module may include a function and a plurality of state characteristics stored in memory.

The method may include the step of generating a connection strand module within the computing system, the connection strand module being configured to functionally couple collaborative computing modules together. The method may include determining one or more state characteristics of each of the first and second collaborative computing modules by placing graphical representations of each of the first and second collaborative computing modules in virtual locations within an n-dimensional Hilbert space displayed on a display device. The method may also include the step of functionally coupling the first and second collaborative computing modules by connecting a graphical representation of the connection strand module on the display device to each of the graphical representations of the first and second collaborative computing modules.

According to one embodiment of the invention, there is a non-transitory, tangible computer readable storage medium that may include executable instructions for a programming environment, the instructions may perform the step of generating a first collaborative computing module within a computing system, wherein the collaborative computing module includes a function and a plurality of state characteristics stored in memory. The instructions may include generating a second collaborative computing module within the computing system, wherein the collaborative computing module includes a function and a plurality of state characteristics stored in memory.

The instructions may include the step of generating a connection strand module within the computing system, the connection strand module being configured to functionally couple collaborative computing modules together. The instructions may include determining one or more state characteristics of each of the first and second collaborative computing modules by placing graphical representations of each of the first and second collaborative computing modules in virtual locations within an n-dimensional Hilbert space displayed on a display device. The instructions may include the step of functionally coupling the first and second collaborative computing modules by connecting a graphical representation of the connection strand module on the display device to each of the graphical representations of the first and second collaborative computing modules.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIGS. 7A-7D illustrates a table of update periods for a collaborative computing unit memory buffer array, according to one embodiment of the invention.

DETAILED DESCRIPTION OF THE INVENTION

Figure 1:
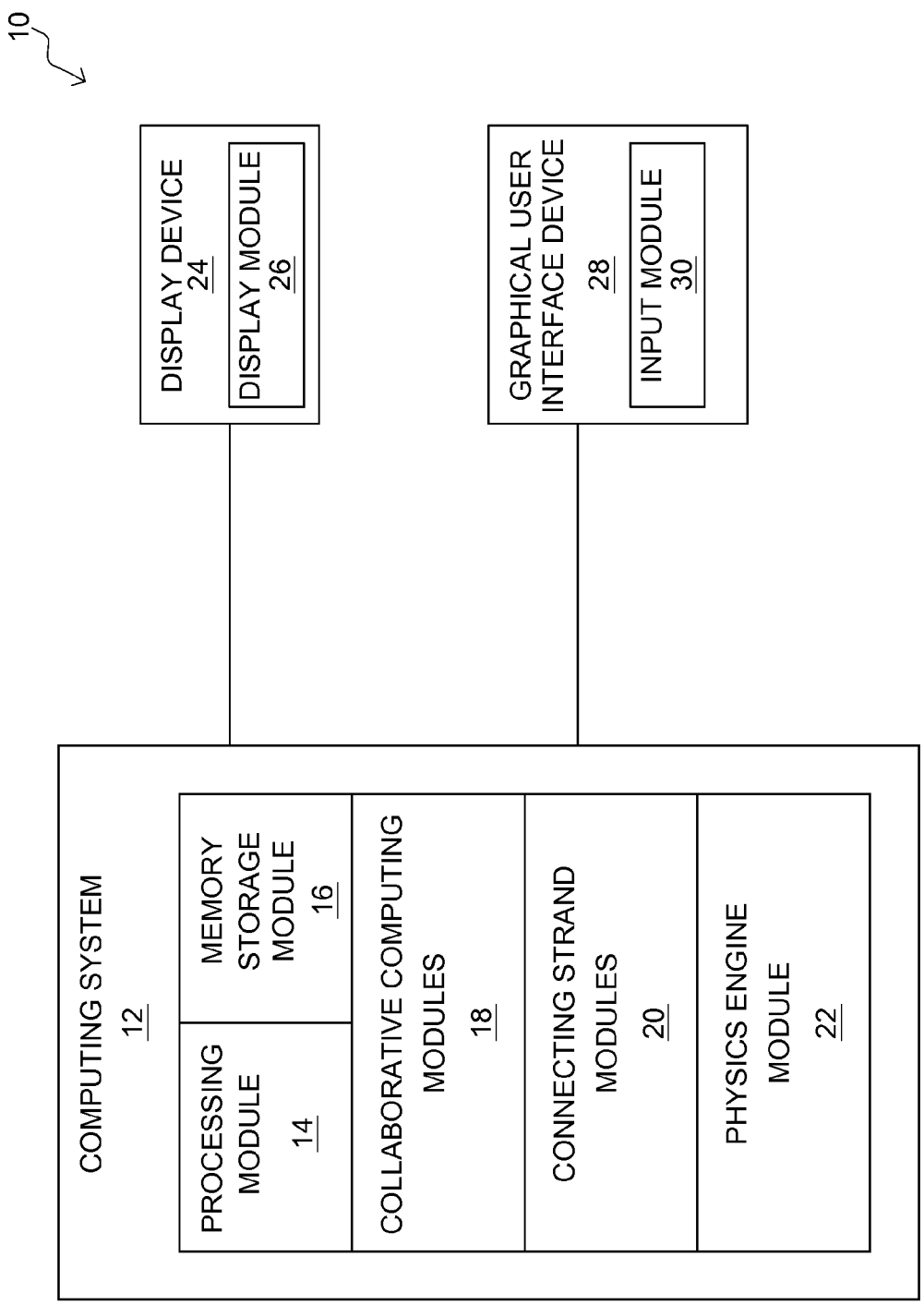
FIG. 1 is a module of a programming system, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Andriod, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" "e.g." or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a module of a programming system, according to one embodiment of the invention. There is shown a programming system 10 including a computing system 12 in communication with a display device 24 and a graphical user interface device 28.

The illustrated programming system 10 is configured to facilitate the programming of computer programs and to facilitate and/or act as a user interface for such programs. The programming system 10 includes a computing system 12, wherein the computing system 12 includes a processing module 14 having a processor. The computing system 12 includes a memory storage module 16 having a memory device (e.g. RAM, ROM, Flash memory, hard drive, CD, DVD) functionally coupled to the processor. Non-limiting examples of a processor module may be a processor module as described in U.S. Pat. No. 6,516,373, issued to Talbot et al.; or a processor module as described in U.S. Patent Publication No.: 2006/0155955, by Gschwind et al., which are incorporated for their supporting teachings herein. Non-limiting examples of a memory storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated computing system 12 includes a plurality of collaborative computing modules 18 stored in the memory device 16 and functionally coupled to the processor, wherein each collaborative computing module 18 includes a function and/or a plurality of state characteristics stored in memory. Diverse collaborative computing modules may be diverse because of their function and/or because of diverse state values stored in their memory. There may be a bank/library of template collaborative computing modules stored in memory whose purpose is to provide developers with modules that may be copied and then modified/placed to suit the needs of the developer. The collaborative computing modules include state characteristics that have significance within the context of the computing system. Non-limiting examples of such state characteristics include simple numerical values; character strings; binary values; media files; unique identifiers; graphical location values; values that interact with the computing environment and/or the function of a physics engine; dual purpose values that determine a graphical location/display of the collaborative computing module within a programming environment and that serve another purpose such as those listed herein and the like and combinations thereof. Non-limiting examples of a computing module may be a computing module as described in U.S. Pat. No. 8,291,140; or a computer module as described in U.S. Patent Publication 2007/0073936, which are incorporated for their supporting teachings herein.

The illustrated computing system 12 includes a plurality of connection strand modules 20 stored in the memory storage module 16 and functionally coupled to the processing module 14, wherein each are configured to functionally couple collaborative computing modules 18 together and to automatically operate on a first subset of the plurality of state characteristics according to a first predefined rule set. As a non-limiting example, a connection strand module may include a maximum "length" and may force one or more connected collaborative computing modules to change a state characteristic associated with graphical representation of location/display when so connected. Wherein a value associated with a graphical representation of a collaborative computing module is so changed and wherein such a value serves a dual purpose, the connection strand module has thereby changed the operation of the collaborative computing module by being connected thereto.

A connection strand module may have a more complicated interaction with connected collaborative computing modules, such as but not limited to emulating a spring, a rod of fixed length, a branch of fixed length that grows over time, etc. There may be a bank/library of connection strand modules stored in memory whose purpose is to provide developers with modules that may be copied and then modified/placed/connected to suit the needs of the developer. The connection strand modules connect to and between collaborative computing modules and generally automatically pass information (e.g. state values) therebetween on triggering conditions and/or perform one or more functions on the same and/or otherwise interact with collaborative computing modules (e.g. automatically triggering activation, directly or otherwise, of another connection strand module). The plurality of connection strand modules 20 may transmit data between connected collaborative computing modules 18 (may be one-way or two way communication). Non-limiting examples of a connection strand module may be a communication module, but not limited to: a communication module described in U.S. Pat. No. 5,307,463, issued to Hyatt et al.; or a communication module described in U.S. Pat. No. 6,133,886, issued to Fariello et al. which are incorporated for their supporting teachings herein.

The illustrated computing system 12 also includes a physics engine module 22 stored in the memory storage module 16 and functionally coupled to the processing module 14, wherein the physics engine module 22 automatically operates on a second subset of the plurality of state characteristics of the plurality of collaborative computing modules 18 according to a second predefined rule set. Such a physics engine module may cause collaborative computing modules that are placed in specific locations to automatically take on specific state values/characteristics, and/or to automatically change the same according to a function and/or rule. Such a physics engine may also influence operation of connection strand modules, such as but not limited to wherein a connection strand module emulates a spring, a physics engine module may include a "gravity" state value that may operate on combinations of "weight" emulating state values of collaborative computing modules in association with "rest length" and "spring constant" values of connection strand modules in order to automatically manage the graphical representation of the program created by such modules and, wherein the graphical representation serves dual purpose of display and influencing function of the modules, will also influence function of the program. Non-limiting examples of a physic engine may be a physics engine as described in U.S. Pat. No. 8,627,329; or a system as described in U.S. Pat. No. 8,554,526, which are incorporated for their supporting teachings herein.

As a non-limiting example, collaborative computing modules that are placed within the computing environment may have a faster clock cycle the higher on the z-axis that they are placed. An associated physics engine module may, through its own state values such as "specific gravity of programming medium" (emulating a fluid in which the program is placed) in combination with "initial position," "weight" and "specific gravity" state values of various collaborative computing modules and "rest length" and "spring constant" values of connection strand modules connected between such collaborative computing modules may calculate z-axis values for the same and force such computing modules to store the calculated z-axis values, which will influence their effective clock rates (or other tied functional or otherwise dual purpose characteristic(s)).

Accordingly, a developer (programmer) may visually build their program, be able to see function values and be able to make connections and place limitations/restraints on the modules that they use. Further, the developer may fine tune the operation of the same by modifying various state values of the physics engine module, collaborative computing modules and the connection strand modules, instead of by hunting through thousands of pages of code. Further, the developer may be able to watch function of the program and thereby more intuitively deduce errors, opportunities and issues with the same in a manner that accesses tools and processing power of the brain not otherwise engaged in the programming process.

A physics engine module may create an environment wherein phenomena found in nature may be utilized in a programming environment such that a developer may, through an intuitive understanding of such phenomena, be better able to program and/or manage such programs. The third subset of characteristics may be an n-dimensional Hilbert space mapped to a set of functions, displayed by the display device 24 and operated upon by the physics engine module 22. Non-limiting examples of such environments that may be emulated and displayed include physical systems (springs and weights, colliding objects, confined gasses, etc.), electrical systems (functioning circuits, solid state devices, etc.), quantum mechanical systems, biological systems (connected brain cells, population dynamics, etc.), and combinations and hybrids thereof and such may be displayed as a Hilbert space, wherein the display does not exactly match what one would see with their eyes upon viewing such a system.

The illustrated programming system 10 includes a display device 24, having a display module 26 which displays on the display device 24 the plurality of collaborative computing units in a visual representation according to a third subset of the plurality of state characteristics. As a non-limiting example, such display may be by displaying a three-dimensional rendering of three state values on a two-dimensional display (e.g. LCD monitor), while also color mapping a fourth state value (e.g. red=0, blue=1). Other non-location based mappings may be used, including but not limited to using animations to represent particular values (e.g. rotational speeds corresponding with particular values), etc. Non-limiting examples of a display module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supporting teachings herein.

The programming system 10 also includes a graphical user interface device 28, having an input module 30, configured to permit a user to manipulate the plurality of collaborative computing units and the plurality of connection strand modules 20 within the computing system 12 such that effective positions of collaborative computing units and connections therebetween are determined by a user, thereby facilitating programming of the same. Such a graphical user interface device may include a mouse, light pen, track ball, keyboard, game controller, touchscreen, etc. and combinations thereof. Non-limiting examples of interface modules may be a HTML player, client server application, Java script application. A non-limiting example of an interface module is FlowPlayer 3.1, manufactured by FlowPlayer LTD, Hannuntie 8 D, ESPOO 02360, Helsinki, Finland. Non-limiting examples of a display/interface module may be a display/interface module as described in U.S. Pat. No. 6,272,562, issued to Scott et al.; a touch screen interface module as described in U.S. Pat. No.

5,884,202 and U.S. Pat. No. 6,094,609, issued to Arjomand, which are incorporated for their supporting teachings herein.

The first subset, the second subset and the third subset may include one or more overlapping characteristics, such as wherein a physics engine module influences a z-axis value and so does a connected connection strand module emulating a spring.

Escalating refresh periods of the array of state memory buffers are related according to an ever increasing scale, such as but not limited to a logarithmic scale (such as but not limited to a binary logarithmic scale). It may be that a second predefined rule set includes a rule biasing position of collaborative computing module 18 towards a point along an axis displayed on the display device 24. It may be that a second predefined rule set includes a rule biasing position of collaborative computing modules 18 in favor of a preferred length of a connecting strand module 20 coupling such collaborative computing modules 18.

A function performed by a collaborative computing module, a physics engine module and or a connection strand module on a state value of another or of a state value received from another may be selected from the group of functions consisting of: storing information, performing a Boolean operation, transmitting information, comparing information, changing an internal state characteristic, changing a state characteristic of another collaborative computing module, changing a state characteristic of a connection strand module, creating a collaborative computing module, creating a connection strand module, controlling hardware, generating an output, processing an input, and changing a characteristic of a physics engine module.

The programming system 10 may include wherein a change in one of the second subset of state characteristics automatically modifies operation of a function of at least one of the collaborative computing modules 18, such as but not limited to modifying a multiplier to a function, changing a clock rate, changing a media value (e.g. a color displayed on a connected display device, wherein the collaborative computing unit controls a pixel of that device). The plurality of state characteristics may include a characteristic from the group of characteristics consisting of: a time period utilized by a function, a unique identifier of a collaborative computing module, a unique identifier of a connection strand module, an active/inactive toggle value, and a data value utilized by a function.

The illustrated collaborative computing modules 18 also each include an array of state memory buffers having escalating refresh periods that progressively store a history of state characteristics of the associated collaborative computing unit. Such an array of memory buffers stores past state characteristics for future recall/reversion of/to the same. Generally such an array includes linked memory buffers, wherein a first (n=0) memory buffer receives values from the current state of the module and subsequent memory buffers receive their values from prior memory buffers in the array (n gets from n−1). Accordingly, historical values cascade along the buffer array during the life of the module.

The illustrated programming system 10 includes a reversion module configured to select a memory buffer level (selecting n for a group of collaborative computing modules and/or connection strand modules) from the array of state memory buffers and cause a plurality of collaborative computing modules to revert to the state characteristics stored at that memory buffer level. Such a reversion may be a full reversion, wherein the state characteristic is fully changed, or there may be a partial or temporary reversion, wherein the current state is saved and the returned to again after a time or once triggered. Additionally, a reversion may be partial wherein the reversion only "counts" for operation of a particular function, such as but not limited to "previewing" a reversion by merely displaying the reverted state, but not actually reverting any of the modules fully.

Figure 2:
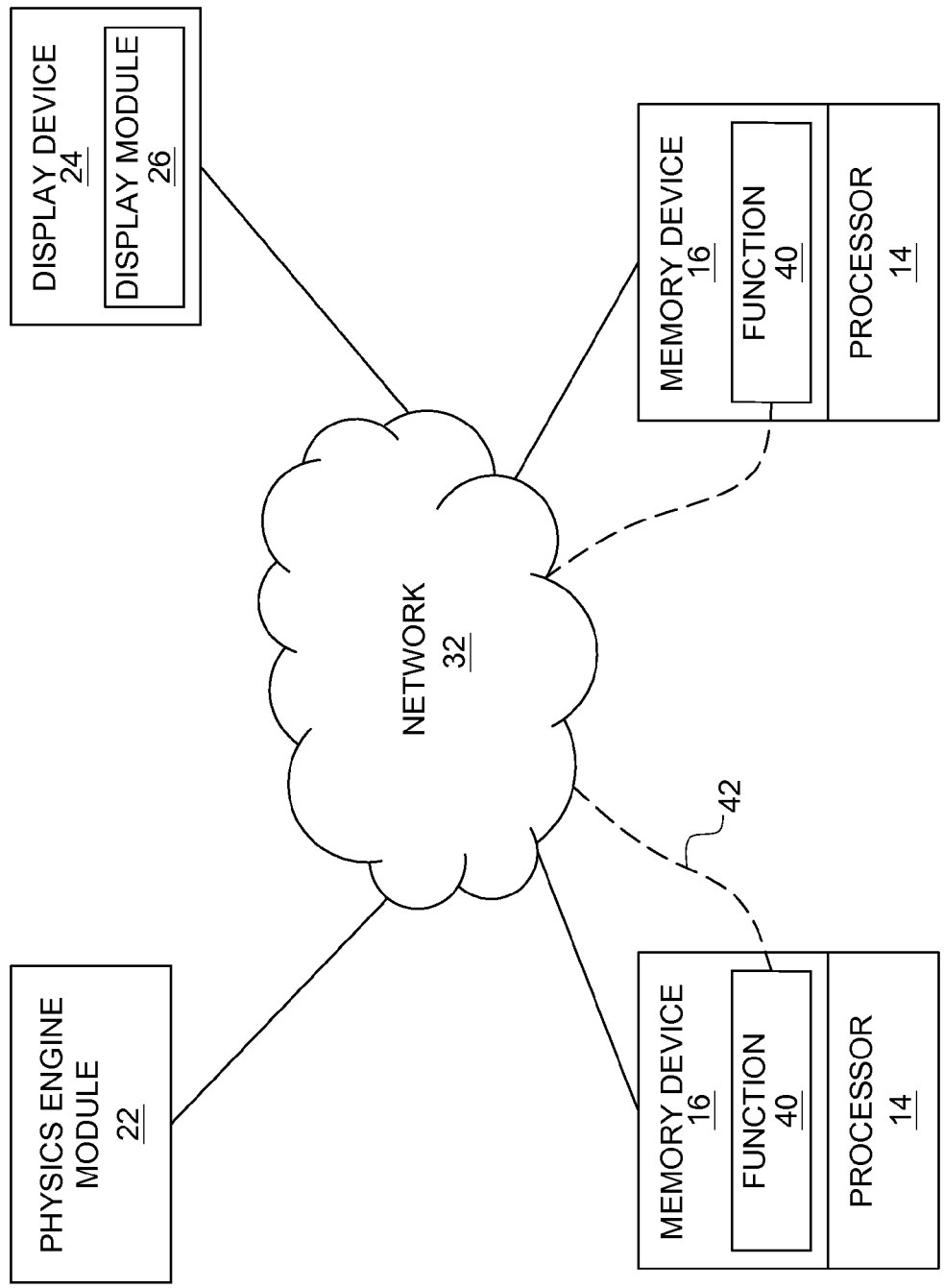
FIG. 2 is a network diagram of a programming system, according to one embodiment of the invention.

FIG. 2 is a network diagram of a programming system, according to one embodiment of the invention. There is shown a programming system including a physics engine module 22 and a display device 24 in communication with a plurality of memory devices 16 over a computerized network 32

The illustrated system of computing over a network 32, wherein the system includes a plurality of collaborative computing modules stored in a plurality of memory devices 16 over a computerized network 32 and functionally coupled to a plurality of processors 14 over a network 32. Each collaborative computing module includes a function 40 and an array of state memory buffers having escalating refresh periods that progressively store a history of state characteristics of the associated collaborative computing unit, and a plurality of state characteristics stored in memory.

The system includes a plurality of connection strand modules 20 functionally coupled to the plurality of collaborative computing modules, wherein each may be configured to functionally couple collaborative computing modules together and to automatically operate on a first subset of the plurality of state characteristics according to a first predefined rule set. The system includes a physics engine module 22 functionally coupled to the plurality of collaborative computing modules that automatically operates on a second subset of the plurality of state characteristics of the plurality of collaborative computing modules according to a second predefined rule set.

The system includes a display device 24, having a display module 26 which displays on the display device 26 the plurality of collaborative computing units in a visual representation according to a third subset of the plurality of state characteristics, wherein the third subset of characteristics may be an n-dimensional Hilbert space mapped to a set of functions, displayed by the display device 24 and operated upon by the physics engine module 22.

According to one embodiment of the invention, there is a computing system including a processing module having a processor. The computing system includes a memory storage module having a memory device functionally coupled to the processor. The computing system also includes a plurality of collaborative computing modules stored in the memory device and functionally coupled to the processor. Each collaborative computing module includes a function and a plurality of state characteristics stored in memory.

The computing system includes a plurality of connection strand modules stored in the memory storage module and functionally coupled to the processing module. Each are configured to functionally couple collaborative computing modules together and to automatically operate on a first subset of the plurality of state characteristics according to a first predefined rule set. The computing system includes a physics engine module stored in the memory storage module and functionally coupled to the processing module, wherein the physics engine module automatically operate on a second subset of the plurality of state characteristics of the plurality of collaborative computing modules according to a second predefined rule set.

According to one embodiment of the invention, there is a non-transitory, tangible computer readable storage medium (e.g. hard drive, DVD, ROM, Hash Drive, Solid State Drive) including executable instructions for a collaborative computing module, having a function and an array of state memory buffers having escalating refresh periods that progressively store a history of state characteristics of the associated collaborative computing unit, and a plurality of state characteristics stored in memory.

According to one embodiment of the invention, there is an input/output device, that may include a collaborative computing module, including a function, an array of state memory buffers having escalating refresh periods that progressively store a history of state characteristics of the associated collaborative computing unit, and a plurality of state characteristics stored in a memory device, wherein the plurality of state characteristics controls operation of the input-output device. The device may include a connection strand module that may be functionally coupled to the collaborative computing module and may be configured to functionally couple the collaborative computing module to a computing system. As a non-limiting example, there may be a keyboard having a plurality of keys, wherein each key is associated with a collaborative computing module and coupled thereto and such modules may then be "wired" to other modules of a program (e.g. a driver) so that operation of the device may occur in the context of a computing environment. Advantageously, the driver program and its associated collaborative computing modules (those associated with the keys) may be visually manipulated as described herein such that the same could be reprogrammed by someone who could visually comprehend the system even if they did not have sufficient experience and ability to program drivers in a traditional manner.

Figure 3:
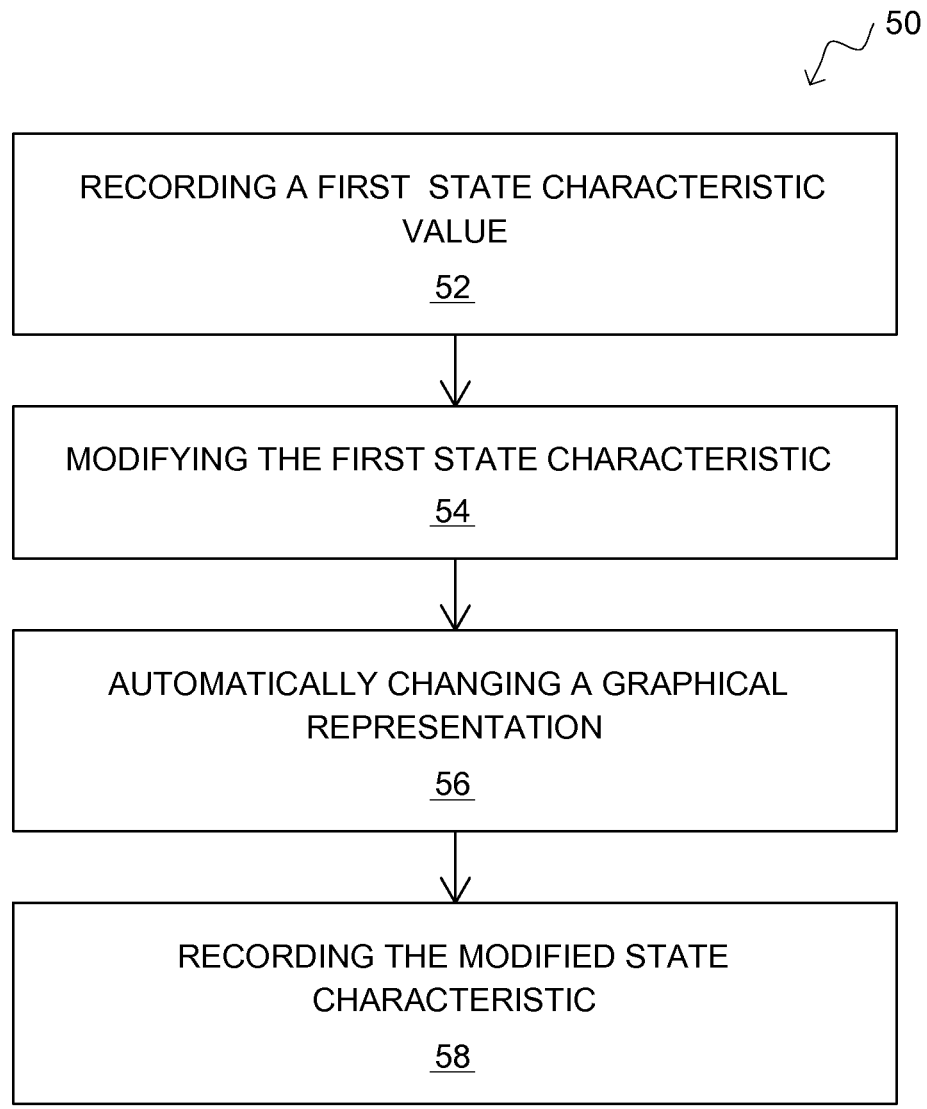
FIG. 3 is a flow chart of a method of computing, according to one embodiment of the invention.

FIG. 3 is a flow chart of a computing method using a programming system, according to one embodiment of the invention. There is shown a computing method 50 using a programming system.

The illustrated method of computing 50 includes the step of recording a first state characteristic value of a plurality of state characteristics of a collaborative computing module in a progressive array of non-transitory, tangible memory buffers (e.g. RAM), wherein the collaborative computing module includes a function and a plurality of state characteristics stored in memory 52.

The method 50 includes modifying the first state characteristic, wherein the modified state characteristic changes operation of the function 54. The method 50 includes the step of automatically changing, by operation of a processor in cooperation with a display device, a graphical representation of the collaborative computing module according to the modification of its state characteristic 56. The method 50 also includes the step of recording the modified state characteristic in the progressive array of non-transitory, tangible memory buffers 58.

The method 50 may include wherein a step of modifying the first state characteristic occurs automatically as a consequence of at least one of coupling a connection strand module to the collaborative computing module, operation of a physics engine module on the collaborative computing module, and a user, through operation of an input device, selectably altering an intended graphical representation of the collaborative computing module.

Figure 4:
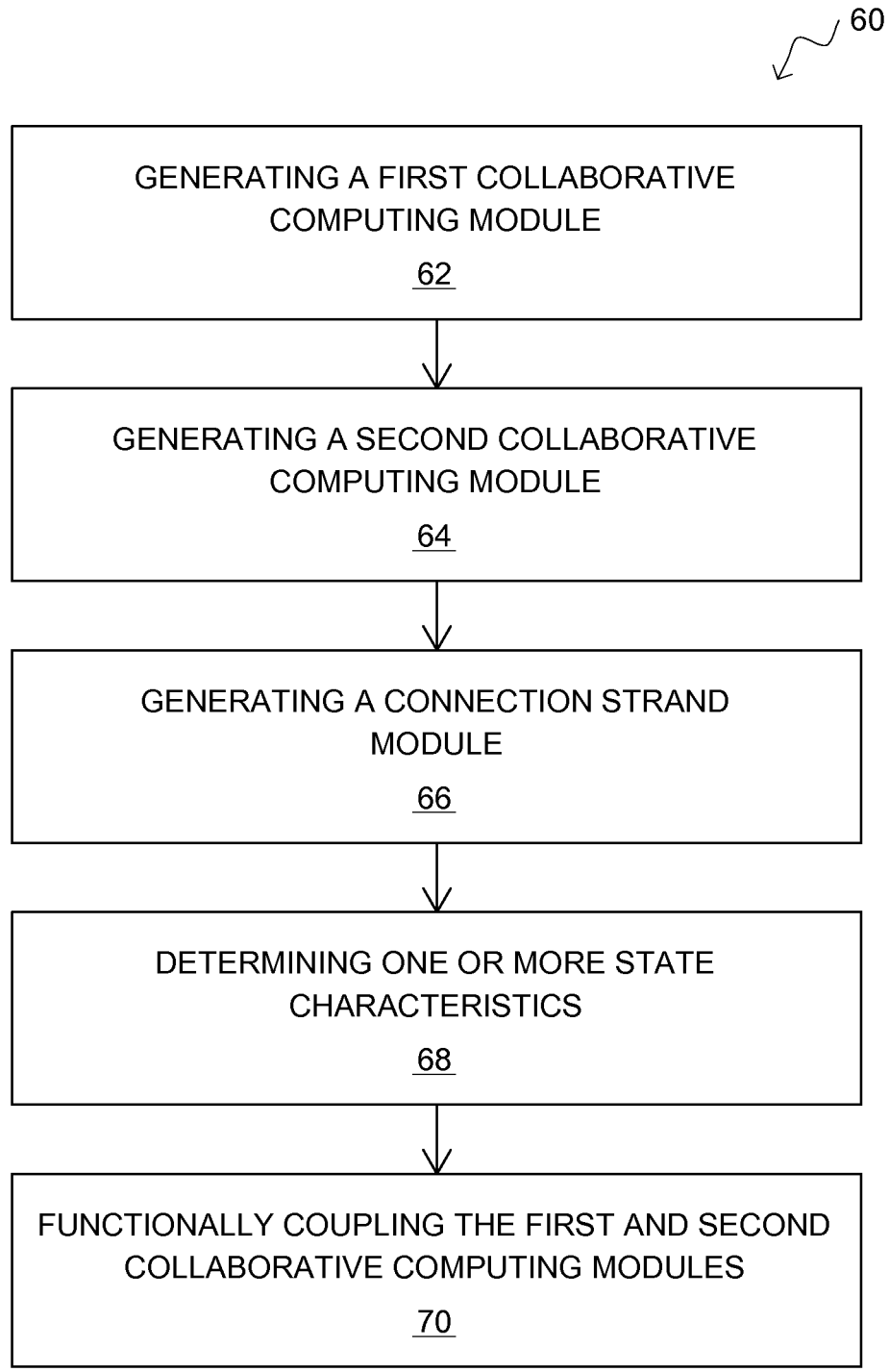
FIG. 4 is a flow chart of a method of programming, according to one embodiment of the invention.

FIG. 4 is a flow chart of a programming method using a programming system, according to one embodiment of the invention. There is shown a programming method 60 using a programming system.

The illustrated method of programming 60 includes the step of generating a first collaborative computing module within a computing system, wherein the collaborative computing module may include a function and a plurality of state characteristics stored in memory 62. The method 60 includes the step of generating a second collaborative computing module within the computing system, wherein the collaborative computing module may include a function and a plurality of state characteristics stored in memory 64.

The method of programming 60 includes the step of generating a connection strand module within the computing system, the connection strand module being configured to functionally couple collaborative computing modules together 66. The method 60 includes determining one or more state characteristics of each of the first and second collaborative computing modules by placing graphical representations of each of the first and second collaborative computing modules in virtual locations within an n-dimensional Hilbert space displayed on a display device 68. The method 60 also includes the step of functionally coupling the first and second collaborative computing modules by connecting a graphical representation of the connection strand module on the display device to each of the graphical representations of the first and second collaborative computing modules 70.

Figure 5:
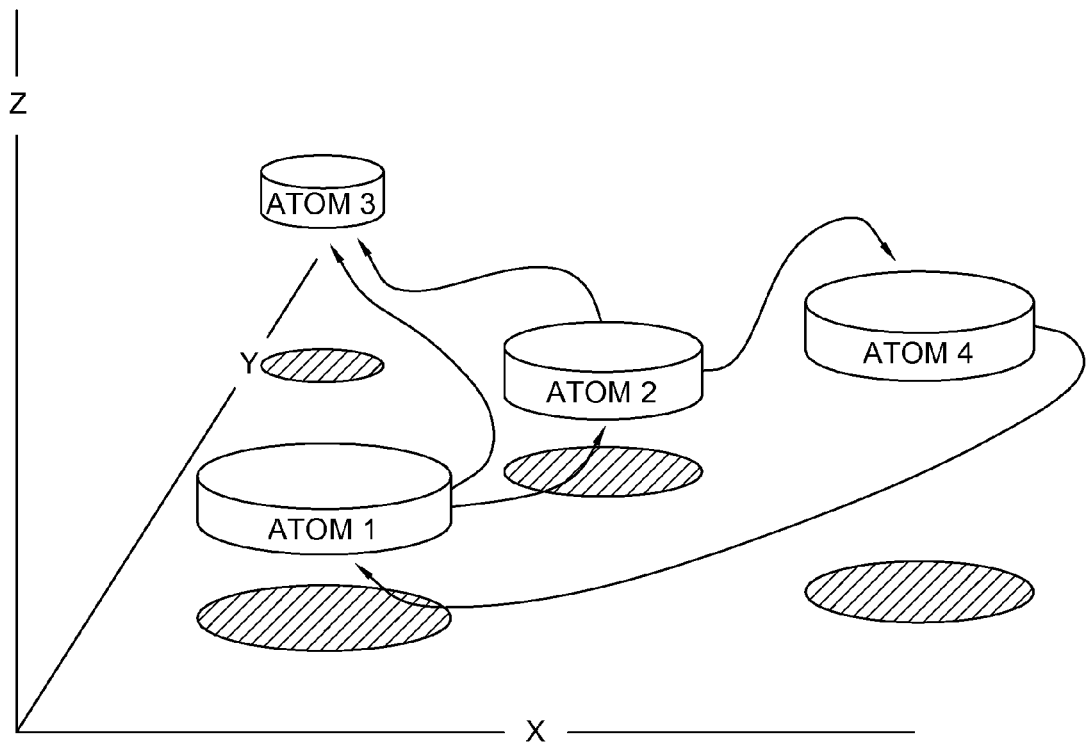
FIG. 5 is a prophetic screenshot of a contextual environment display of a plurality of connected collaborative computing units, according to one embodiment of the invention.

FIG. 5 is prophetic screenshot of a contextual environment of a plurality of connected collaborative computing units/modules (called herein: atoms) existing in a computing environment, according to one embodiment of the invention. There is shown a plurality of atoms in communication with each other by a plurality of connection strands. The atoms are illustrated as data silos, the connecting strands as one-way arrows, and the computing environment as the axis and spatial relationships between the atoms.

The illustrated example shows four exemplary atoms in a computing environment connected by five connecting/connection strands, wherein the computing environment displays three axis/dimensions (x, y, and z). Shadows under the illustrated atoms facilitate visualization of their three-dimensional "location" in the space of the computing environment.

A computing environment may be a simple computerized device having a processor, memory, bus, and/or one or more i/o devices. A computing environment may include one or more servers, i/o devices, memory devices, dumb terminals, smartphones, tablet computers, personal computers, and/or the like and combinations thereof that may be connected over one or more networks.

The illustrated computing environment is configured to provide connection strand capabilities to a plurality of atoms, thereby providing a collaborative and interactive communication system. Such may include an operating system, a programming language and/or a programming environment/wizard/tool/suite, or the like and/or combinations thereof and may include one or more user interfaces and/or user interface modules. The computing environment may also include a set of environmental rules that may be enforced through a physics-type engine/module (or other module) which may interact with one or more of the atoms.

Non-limiting examples of environmental rules may include imposing gravity conditions on a virtual three dimensional space (such as but not limited to the illustrated space) wherein characteristics of individual atoms, connection strands, and/or associations between atoms through connection strands may logically interact with the gravity conditions and/or each other in a manner that can induce changes in one or more characteristics of atoms, connection strands, and/or environmental conditions.

As a non-limiting example, in the illustrated example, Atom 2 may be defined in the environment to be disposed at a z location that is inside a gravity well (e.g. floating on a fluid that has a top surface at the same z location as Atom 2), while Atom 4 may have a stored characteristic (e.g. weight) that causes it to sink below that same level when the environmental rules are applied thereto. The illustrated connection strands may store "rest lengths" and/or "spring constants" as if they were modeling springs. The characteristics of the connecting strands connecting to Atom 3 may cause it to be forced by the physics-type engine to a higher z location than it would otherwise naturally rest at because of its own internal characteristics. Atom 1 may have previously been disposed at a location more "remote" from the other atoms, but when connected by connecting strands may have "moved" closer because of the "rest lengths" of the connecting strands.

In another non-limiting example, the illustrated atoms may represent and model business entities that buy/sell two items of value at varying prices (represented by locations on the x and y axis) while inventory levels may be represented on the z axis and by a color of each atom or by a sound produced by each atom (neither illustrated).

Connecting strands may represent buy/sell relationships among the entities. The illustrated atoms may also include functional operations wherein received data (representing sold/purchased items) may be operated on to produce and/or transform either of the two items of value and/or to consume either of the two items of value. In such a system, one may expect the displayed atoms to move about over time and the illustrated example is merely a "snap-shot" of one moment in time, or perhaps an example of a stable configuration of the atoms. Wherein atoms include long-term memory, such as that described in FIG. 2, it may be possible to easily revert a set of atoms to a configuration at an arbitrary point or region in time without having to "walk-backwards" through each iteration between the "now" time region and the previous time region.

Other non-limiting examples of environmental rules include rules modeling electrical circuits, optics, wave behavior, neural networks, prey-predator relationships, cellular cultures, celestial bodies, molecular chemistry, economic principles, software languages, social networks, and the like and combinations thereof. Visual, auditory, tactile and other sensory information may be mapped to characteristics of the computing environment and/or its environmental rules. Users may be enabled to create, move, adjust, connect, and otherwise "program" the atoms, computing environment, rules, and/or connecting strands thereby building sets of related and/or associated atoms as desired. Computing environments may be subdivided into "regions" of sensory "space" that may have varying environmental rules, while permitting connections between atoms to straddle the boundaries of such regions. Atoms may be moved between regions and/or may automatically alter region rules, locations, sizes, and the like.

Connection strands may be as simple as pointers, shared memory addresses, shared variables, data transmission modules, and the like and combinations thereof. Connection strands may be specialized atoms having function modules that merely transmit data or that transmit data while amplifying, modulating, and/or attenuating the same. Connection strands generally include stored characteristics (or merely operational parameters) that include starting and ending atom identifiers, computing environment characteristics, and the like and combinations thereof.

Atoms may be memory storage and/or processing modules. In this paragraph, the term "A connected to B" means having a one way connection by connection strand from A to B. Atom 1 is connected to each of Atoms 2 and 3. Atom 2 is connected to each of Atoms 3 and 4. Atom 3 is not connected to any other illustrated atom. Atom 4 is connected to Atom 1. Accordingly, Atoms 1, 2 and 4 may form a feedback loop, while Atom 3 is a receiver of information from Atoms 1 and 2, wherein illustrated connecting strands transmit information.

A plurality of atoms may function in various and/or multiple manners. An atom may be configured to react when something happens to it (data reception, being "moved" by a user/computing environment/connecting strand/etc., proximity to other atoms, time passing, etc.). An atom may also be configured to compare messages to create resultant message or behavior and/or otherwise to perform operations on received and/or stored data. An atom may be configured to query or modify the attributes of other atoms in connection thereto. An atom may be configured to create new connection strands and/or create new atoms. An atom may be configured to affect global or pseudo-global parameters.

Each of the plurality of atoms may be configured to provide or perform one or more of the following non-limiting exemplary functions:

The following is a key explaining the general meaning of numbers before each explanation. In particular, they represent more fundamental classifications of functionality:

1—React when something happens to it.

2—Compare messages to create a resultant message or behavior.

3—Query or modify the attributes of other atoms.

4—Create new connection strands and/or new atoms.

5—Affect global or pseudo-global parameters.

| "Default"; | 1 - | Passes messages on. |
|---|---|---|
| "I/O"; | 1 - | Captures some of or all user input (i.e. keyboard & mouse) and sends a message every time there is new input. |
| "Timer"; | 1 | Sends a message every time a specified number of milliseconds elapses. |
| "Conveyor"; | 1, 3 - | Basically amounts to an extension-cord with multiple sockets. In other words, when it is queried or modified, it will pass on the query or modification along its connection strands without any result to or from itself. |
| "Reactor"; | 1 - | Sends a message when the specified attribute(s) of the specified atom(s) is modified. |
| "Console"; | 1 - | According to settings, it displays content based on messages it receives. (primarily used for debugging) |
| "Coinbank"; | 1 - | Deals with deposited or withdrawn credits. |
| "Scale"; | 1, 2 - | When triggered, it compares things. Depending on its settings and what is connected to it, it will either perform the operation on the content of the atoms connected to it; on a specified number of consecutive messages from the atoms connected to it; or a combination of these; and then send a message with the result. |

| | | |
|---|---|---|
| "Operator"; | 1, 2, (3) - | When triggered, it performs mathematical operations including Boolean logic. Depending on its settings and what is connected to it, it will either perform the operation on the content of the atoms connected to it (for example you wrote the number four inside an atom); on a specified number of consecutive messages from the atoms connected to it (for example it might be set to perform addition on three consecutive messages before sending a message and clearing the slate); or a combination of these; and then send a message with the result. |
| "Imploder"; | 1, 3 - | Causes all specified atoms to zip up or implode into itself (i.e. A big messy molecule appears to become a single atom, when triggered). |
| "Query"; | 1, 3 - | When triggered, it queries a specified attribute of a specified atom and sends a message with the result. |
| "Modify"; | 1, 3 - | When triggered, it modifies specified attribute(s) of specified atom(s). |
| "Chain"; | 1, 4 - | When triggered, it creates new connection strands between specified atoms. |
| "Duplicator"; | 1, 4 - | When triggered, it creates new atom(s) based on other atom(s) and if specified, also recreates all their respective connection strands and/or settings in the new copy. |
| "Basket"; | 1, 3, 4 - | Creates connection strand(s) with atom(s) while they are within its perimeter, and uses those strand(s) to modify atom(s) so that they move with it. The end result is that it behaves like a basket with stuff in it. |
| "Conductor"; | 1, 3, 4 - | Creates connection strand(s) with atom(s) while they are within its perimeter and messages that it receives it conveys across those strands, in full or in part depending on settings. |

The following functions may be associated with physics engine modules, macro-blocks, programming interfaces/environments, entities and/or networks:

| | | |
|---|---|---|
| "Portal"; | 1, 5 - | Sends the viewpoint camera to the specified entity. |
| "Physics"; | 5 - | By changing its settings the physics of its containing environment change. |
| "Visible to"; | 5 - | Any entities you put in it can see the containing environment (i.e. a facet) or the specified atom(s). Works something like a conductor or a Basket. |
| "Authority to"; | 5 - | Any entities you put in it can modify (fully or partially) the containing environment (ie. A facet) or the specified atom(s). Works something like a Conductor or a Basket. |
| "Time machine"; | 1, 5 - | Animates the specified atom, circuit, or computing environment (i.e. a facet) the specified number of milliseconds back in time, and/or reverts to the specified state (a message containing milliseconds recalls a snapshot of a previous state, and a "revert" message commits the regression). |

An atom operated upon by a function may be a specified atom. In one non-limiting example, it may be that creating a connection strand from A to B automatically specifies that atom A should affect atom B. Accordingly, atom B is then a specific atom targeted by atom A. This function may be extended to operate on multiple children and grand-children (i.e. entire circuits/molecules). Users, computing environments, and/or atoms may be able specify settings for atoms and connection strands. For example the I/O atom may catch just the mouse and not the keyboard, or just left-mouse clicks etc. Similarly, connection strands may either communicate any kind of message in its entirety (i.e. Communicate everything), or they may filter out parts of messages or only communicate specific parts of messages. There may be context menus for specifying the settings of atoms and connection strands. The look and feel of the context menus resembles the rest of the environment. Connection strands represent persistent relationships between atoms. An alternative solution doesn't include strands between atoms at all, rather atoms determine their own communication with other atoms by keeping a list of which atoms they are communicating with.

According to one embodiment of the invention, the connection strands may be unidirectional. In such a mode, to achieve two-way communication between atoms, two strands are used (i.e. one from A to B and one from B to A). An alternative solution may be to have bidirectional connection strands, or to have both bidirectional and unidirectional connection strands available in the same environment.

According to one embodiment of the invention, the scope of the actions carried out by any single atom may be very narrow. Thus the scope of the messages propagated across connection strands may also, in general, be relatively narrow. As a result, complex applications in an environment may be the result of complex configurations of atoms, their connection strands, and the settings of all of the atoms and strands. An alternative solution may be to propagate complex scripts between the atoms, which may carry out the scripts. In other words, in this alternative solution the scope of the possible actions carried out by any single atom may be much broader, and complex applications may be devised in a small number of scripts and executed by a small number of atoms. Wherein the atoms and connecting strands are simple, the engine may be more robust, circuits may better survive engine upgrades, and/or entire circuits may communicate very organically.

According to one embodiment of the invention, an atom and strand memory may be a lot like multi-user, global, non-linear undo buffers. Adobe Photoshop has a history palette that is a series of global snapshots of the project. A snapshot is taken after every action. Microsoft Word employs multiple undo states, or snapshots, that are recorded based on a combination of user activity and how much time has elapsed between actions.

In one non-limiting embodiment, each atom may have its own undo buffer, and snapshots may be remembered in logarithmic intervals so long as there was a modification worth remembering. Modifications not worth remembering include size and position vibrations below a certain error level, proportional to the scale of the atom or the molecule it's a part of, or the scale of other atoms occupying the same macro-block neighborhood. Strands behave basically the same way but they also keep snapshots of the messages that are sent across them, in the same logarithmic fashion.

The logarithmic memory states may not have to start any more granular than 500 milliseconds. One non-limiting example may be that a user creates an atom at time 0. The undo buffer will take a snapshot of every attribute of the atom and place it at the top of the buffer (since in one sense every attribute changed from undefined to defined). Suppose the user leaves it there, untouched, for a thousand years. At each logarithmic interval, it may move the snapshot in the corresponding slot down the buffer (i.e. every buffer 0 every 500 ms, buffer 1 every 1 s, buffer 2 every 2 s, buffer 3 every 4 s, . . . etc). Then, let's say a thousand years later, the user moves it exactly horizontally across the screen (i.e. only the x coordinate changes). Suppose it takes the user just over one second to move it and the user starts just under half a second past 1000 years.

According to the non-limiting example above, at 1000 yrs the original creation snapshot will be at the $36^{th}$ slot in the buffer. The move starts about 274 ms later, but at 500 ms past 1000 yrs, a new snapshot may record just the x location (x=387 at this point in the move). After another 500 ms (t=1000 yrs.+1.0 s), buffer 0 may be moved to buffer 1 and a new snapshot may be recorded in buffer 0 with the new x position (x=745 at this point in the move).

The idea is that buffer 0 moves down every 500 ms, buffer 1 moves down every 1 s, buffer 2 moves down every 2 s, and buffer n moves down every $2^{n-1}$ s. If buffer n & buffer n+1 both move down at the same time, then both snapshots are preserved, but if buffer n moves down on top of buffer n+1, then it may overwrite it (actually it overwrites the respective attribute otherwise it merges). This way, detail may be gradually forgotten. It may be impossible for a transitional snapshot of something that happened within a time interval smaller than $2^{n-1}$ seconds to be preserved by the time it reaches the $n^{th}$ slot. The result may be that the memory tends to preserve the most persistent states relative to any particular time-scale.

When it may be time to retrieve a snapshot, empty buffers may inherit the nearest value below them for each respective attribute. So, in effect, at t=1000 yrs, all of the buffers between 0 and 36 store a value of 0 for x, and at t=1000 yrs+4.0 s, all of the buffers between 4 and 36 may still store a value of 0 for x.

The time intervals may be dictated by the computing environment (i.e. the facet the atoms are native to). When undo buffers are reconciled between computing environments (i.e. facets of the same entity or different entities), the maximum divergence error resulting from different absolute creation times is 500 ms (granted the computing environments have relatively synchronized global clocks).

Animation may be achieved using a special time-machine atom and its complimentary circuitry that may make it user friendly and easily accessible. It may animate the contents of the entire computing environment (i.e. a single facet), or the constituents of a particular circuit (i.e. a molecule), or just one atom, or entities, or networks, or entire layers of the computing environment. If the user wishes to revert to a particular state, the specified snapshot may be simply applied to the current atom or atoms, or entities etc. In other words, to revert to a previous state it may not manipulate the buffer; it may just apply a new current state based on an old snapshot. The scope may be specified by linking the atom to the appropriate fixture (i.e. a time-machine atom with no children will animate all of the atoms within the facet, and one that is linked to a specific included in the snapshot). The snapshots may always be reconstructed from the bottom buffer (i.e. buffer 39) up, but it may be more efficient another way. Applications like word-processors may employ these time-machine atoms to achieve customized undo functionality.

According to one embodiment of the invention, if a user captures a snapshot of messages cascading through complex circuitry at a certain time, the process of capturing the snapshot may lead to degraded or erroneous behavior in the circuit. Accordingly, to avoid such a problem, it may be that although the time-machine atom may cause the remembered messages to be visibly fired, as long as the time-machine atom is set to a specific time, no messages may actually modify any atoms. In other words, messages may not cascade or have any impact on the atoms. Apart from being able to visualize where messages are being transmitted.

In regards to deleted atoms, by default, deleted atoms may only be partially deleted until every slot in their undo buffer is empty except for the creation snapshot. This way, it will only be forgotten when the amount of time since it was deleted is greater than or equal to twice its entire lifespan. There is scope for very different secondary undo buffers. The buffer described thus far may be universal and not adjustable (ever) for maximum compatibility. It illustrates the basic functionality of buffers in the system and how they may be accessed. Secondary buffers however, may be modified for various purposes. For example, a secondary buffer may be longer (i.e. 10,000 slots) and it may take snapshots at linear intervals (i.e. every 500 ms). This may be useful for certain types of animations. They may also be set to only record modifications to a specific attribute or attributes. Or they may be set to take snapshots only when a modification occurs and record that modification along with a global time stamp instead of updating at predefined intervals (useful for accounting circuitry for example). Secondary buffers may also be frozen so that, for example, they may record modifications once per minute for one full day, but no more. This way the user may create project templates with variable detail during critical time-periods etc. It also enables the user to easily set up circuits for collaborative video and audio editing environments, or animated physics experiments, or animated socio-economic experiments.

In general, final deletion of atoms does not depend on secondary buffers. Snapshots of secondary buffers may be included in the snapshots in the primary buffer when they are modified or created. Strands remain in a similar, partially deleted state until either it's affecting or accepting atom is finally deleted, since a connection strand cannot be older than the younger of the two.

A register of those atoms that share the same neighborhood may be organized in what may be referred to as Macro-blocks, in order to optimize functions that depend on proximity. These include physics interactions, detecting what the mouse is hovering over, or performing proximity dependent searches. This approach to proximal optimization may be done with a simple square grid of a fixed size or any number of other solutions.

In one non-limiting embodiment, a particular solution includes an iterative process to create neighborhoods of variable sizes depending on the needs of the atoms occupying the computing environment (i.e. a facet or a layer of the computing environment). This solution has one special advantage: when partial privacy regarding a user's publicly disclosed location is used, the iteratively scaled macro-blocks enable users to publicly reveal their locations on whatever level of precision they want.

According to one embodiment of the invention, there is a macro-block organization that may include nineteen hexagonal macro-blocks arranged in a spiral that form a large hexagon. This may be the first iteration within the computing environment (i.e. the facet). It may be continually extended in a spiral for larger computing environments (i.e. on a layer, in which case proximity searches are in relation to entities and networks, not atoms). Each hexagonal cell may keep a register of all the atoms within it. It may be up to the atom to register itself with the macro-blocks it inhabits.

If an atom wants to know which atoms are close to it, essentially it may ask the macro-block it inhabits who else may be nearby. If an atom is almost exactly on the edge of a macro-block, it may not consider itself 'close' to atoms on the other side of the edge since they are in a different macro-block. For this reason, macro-block grids may always be tripled with transposition offsets equal to the length of one edge of a macro-block at angles of 0 and 60 degrees. Each atom may always register itself in the three macro-blocks it inhabits at its particular scale.

According to one embodiment of the invention, there is a scale and a process of dynamic iteration. There may be no need to have an infinite iteration of progressively tiny empty macro-blocks everywhere. However, when a particular macro-block becomes highly populated (presumably with very small atoms), then it may be no longer optimized. At this point the overpopulated macro-block may become subdivided and set its "subdivided" value to true. There may be an optimum over-population trigger for subdividing. A subdivided macro-block may have three overlapping sets of 19 blocks each, but rotated 30 degrees from the parent block in order to minimize excess. This occurs for as many iterations as necessary to optimize neighborhoods. When the need for a subdivided macro-block ends, it may be discarded and any atoms registered in the subdivided blocks may get transferred to the parent block. In the case of subdivided blocks, the excess around the edges may make it unnecessary to subdivide all three overlapping parent blocks. In other words, subdivisions may happen to single blocks, not triplets of blocks.

In a generic sense, the computing environment may only need to keep track of the above mentioned macro-blocks and the physics settings (i.e. gravity, dampening, collision settings, and spring settings). The computing environment may also be susceptible to the impact of global or pseudo-global atoms such as the "Visible to" and "Authority to" atoms. In our specific solution, there may be multiple self-contained environments. Facets may each have their own physics settings and macro-block registers as well as many other attributes that come into play in operation of the system. Multiple facets may exist within a single entity. Entities and networks in turn may exist on a layer of the system, again each with self-contained physics settings and macro-block registers.

The computing environment (i.e. the facet) may also have a self contained file system associated thereto. The file system may be a list of file names and types and the file-data comprising the actual data. The atoms may then only need to specify a file name and type to access the file data (i.e. a picture). When facets are synced, this content-data may also be synced if there are any checksum mismatches or the content-data doesn't exist yet in the local cache.

In one non-limiting example, there is a real-time collaborative computing unit (an atom) which may be combined with others in a computing environment, thus permitting data storage, processing functions, and the like and combinations thereof. When the atom is modified (such as but not limited to when media is stored in an atom), the computing environment may reflect the change (visually, in a table, etc.) in real-time. Each atom has its own short and long term memory of one or more sets of information, which may include but is not limited to characteristics of the atom itself and/or received information and/or to changes of the same over time. An atom may contain/store any kind of media or file (audio, video, text, picture, data stream, database, etc.). An atom may also include one or more functions and/or functional operations that it may perform on received/stored data, such as but not limited to Boolean functions, connecting atoms, creating atoms, circuitry mimicking functions, etc. Atoms may exist in and/or obey a physics-type engine in the environment(s) in which they exist. Every atom can be connected to any other atom via a connecting strand. Connection strands can behave like springs in a physics engine, or otherwise exert an influence on one or more atom characteristics in the context of the computing environment and/or its environmental rules. Strands may function in a manner simulating chemical bonds or pathways in a circuit. Strands may convey messages of varying complexity to and/or between two connected atoms. Connection strands may be unidirectional in their ability to deliver messages. It may be that there is no specific limit to how many strands an atom can have emanating therefrom and/or be on the receiving end thereof. Atoms may exist within computing environments (facets). The facets govern the physics-type engine(s) that apply to atoms. A computing environment may map one or more atom characteristics to a visual representation of the atoms and/or their relationships to each other. Atoms may be mapped to one or more hardware processor cores, thus sharing and/or distributing use of processing resources.

The display device may update its graphical representation of the plurality of collaborative computing units in real-time, such as but not limited to when a state characteristic of the third subset of the plurality of state characteristics is changed such as but not limited to when a programmer, user, connecting strand, physics engine module, and/or other collaborative computing unit module causes such a change to occur. As a non-limiting example of such, a state characteristic of a collaborative computing unit may be associated with its X-axis position on a display and change of that state characteristic may be followed by a change, in real-time, with the displayed position of the graphical representation of that collaborative computing unit. The physics engine module and/or one or more connection strand modules may operate in real-time, such as but not limited to a physics engine causing a change in a collaborative computing unit in real-time in response to that collaborative computing unit having a changed state characteristic that meets a predetermined threshold or a connection strand module transmitting a message from one collaborative computing unit to another in real-time response to a state characteristic change. As used herein, the term "real-time" means without substantial perceivable delay, wherein a delay is substantially perceivable if a user cannot associate associated changes with each other, e.g. a change in a display of a graphical representation of a collaborative computing unit with an associated change in a state characteristic thereof.

Figure 6:
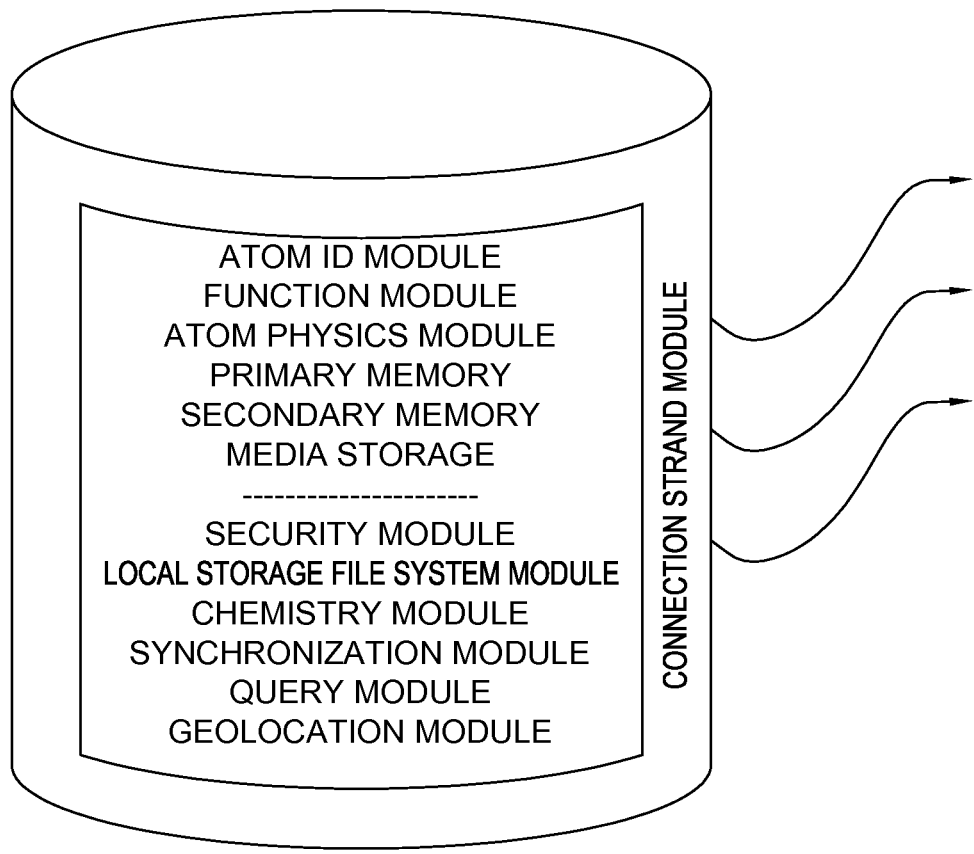
FIG. 6 is a module diagram of a collaborative computing unit, according to one embodiment of the invention.

FIG. 6 is a module diagram of a collaborative computing unit, according to one embodiment of the invention. There is shown an atom, of a collaborative computing system, including an atom identification module, a function module, an atom physics module, a short term memory module (primary memory module), a long term memory module (secondary memory module), a media storage module, and a connection strand module along with the following exemplary functional modules: a Security Module, a Local-storage file system module, a Synchronization Module, a Realtime Collaboration Module, a Chemistry Module, a Query Module, a Geolocation Module. The illustrated atom is configured to communicate and collaborate in real-time with other atoms over a computing environment.

The illustrated atom includes an atom identification module configured to provide identification to the atom, such as its properties and capabilities. The atom identification module is configured to provide characteristics, parameters, and settings for the functioning and capabilities of the atom. The atom identification module may also include a unique identification to identify the atom from all of the other atoms within a particular computing environment. The atom identification module may include characteristics of the atom that are associated with its "place" in the computing environment and/or with its interactions with one or more physics-type engines.

The illustrated atom includes a function module that may be in communication with the atom identification module (as well as other modules described herein as needed) and configured to perform one or more functions and/or operations associated with data accessible by the atom, such as but not limited to: operating on and/or being triggered by data received by the atom through a connection strand, changing a state characteristic (or other stored memory) of an atom (there may be a Chemistry module which may manage, control and/or record how atoms can interact with and/or change one another, such that the rules for such within the system may be consistent, changeable, organized, distributed and/or otherwise managed), and the like. The function module may receive instructions, parameters, or settings from the atom identification module and may perform its function(s) according to the instructions, parameters, or settings. Non-limiting examples of functions/operations include addition, subtraction, comparison, multiplication, division, inversion, OR, XOR, AND, NOT, WITHOUT, masking, filtering, appending, concatenating, creating (atoms, connection strands, macro-blocks, computing environment regions, etc.), deleting, and the like and combinations thereof. A function module may be in communication with one or more connection strands (incoming and/or outgoing).

The illustrated atom includes an atom physics module in communication with the atom identification module (as well as other modules described herein as needed) and is configured to provide/facilitate/enforce physics-type related behavior to the atom and/or its connection strands. The atom physics module is configured to provide collaborative capabilities to the atom. It may be that some or all significant modifications to atoms, including movement, content changes, and/or settings changes are automatically passed to all real-time collaborative participants, such as being automatically connected to other atoms with related characteristics, automatic self-enforcement of rules present in its computing environment, processing appropriate responses to changed/changing conditions, and the like and combinations thereof. It may be that the computing environment dictates (also or only) to the atom how it should be affected by physics.

The illustrated atom includes a primary memory module and a secondary memory module or modules that may be in communication with the atom identification module and/or the function module (as well as other modules described herein as needed). It may be that one or more of the memory modules, such as but not limited to the primary memory module, may specifically not be able to be manipulated by one or more users/programmers/accounts/etc. because of one or more restrictions, such as but not limited to being restricted by the system and/or a user interface thereof. It may be that a short term memory module is configured to store memory related to the atom for a short duration of time (compared to the storage that occurs at a long-term memory module). There may be a register, database, record, table, memory address, and/or etc. or the like that may store information about one or more characteristics of the atom and/or information that may be received from one or more connection strands, and/or information that may be processed through the function module.

The illustrated atom may include a long term memory module in communication with a short term memory module and that may be in communication with the atom identification module and the function module. The long term memory module is configured to store memory related to the atom for a long duration of time (compared to the storage that occurs at the short-term memory module). There may be a register, database, record, table, memory address, and/or etc. or the like that may store information about one or more characteristics of the atom and/or information that may be received from one or more connection strands, and/or information that may be processed through the function module. The long-term memory module may automatically register data found in the short-term memory module and thereby be a repository for historical values and/or historical average values of one or more characteristics and/or information stored therein.

The illustrated atom includes a media storage module in communication with the atom identification module and/or the function module (as well as other modules described herein as needed). The media storage module is configured to store data related to media, such as music, articles, videos, spreadsheets, charts, etc.

Each of the primary memory module, the secondary memory module(s), and the media storage module are configured to store data transferred between the modules and components of the atom and other atoms. Data or media storage modules may be databases or data files, and the memory storage device may be hard drives or tapes, and the like and combinations thereof. A non-limiting example of a data base is Filemaker Pro 11, manufactured by Filemaker Inc., 5261 Patrick Henry Dr., Santa Clara, Calif., 95054. The data storage module may include a flash storage drive. Non-limiting examples include: a HP Storage Works P2000 G3 Modular Smart Array System, manufactured by Hewlett-Packard Company, 3000 Hanover Street, Palo Alto, Calif., 94304, USA; a Sony Pocket Bit USB Hash Drive, manufactured by Sony Corporation of America, 550 Madison Avenue, New York, N.Y., 10022.

The illustrated atom includes a connection strand module in communication with the atom physics module and the function module (as well as other modules described herein as needed) and is configured to provide connection capabilities and/or physics-type association functionality to other atoms over a computerized network. The connection strand module is configured to communicate between atoms. The connection strand module may be in communication with a computerized network and configured to transmit data therethrough, to another atom. Apart from sending messages within a local computing environment, the connection strand module may include wireless communication means, in addition to a direct line communication connection. Non-limiting examples of a connection strand module may be but not limited to: a communication module described in U.S. Pat. No. 5,307,463, issued to Hyatt et al.; or a communication module described in U.S. Pat. No. 6,133,886, issued to Fariello et al. which are incorporated for their supporting teachings herein.

FIGS. 7A-7D illustrates a table of update periods for a collaborative computing unit memory buffer array, according to one embodiment of the invention. There is shown an array of forty related memory buffers (0-39), such that each memory buffer updates at a rate that is twice the rate of the subsequent memory buffer (i.e. Buffer 7 updates every 64 seconds while the subsequent memory buffer updates every 128 second). This produces an exponential growth in update periods along the array of memory buffers. Accordingly, the array of memory buffers has a very long state memory (>8,000 years) while still having a fine granularity of short term memory (½ second, 1 second, 2 seconds, 4 seconds, etc.).

The "Updates Every" column gives a rough indication at the rate at which the associated memory buffers update, and more exact update rates for the illustrated array of memory buffers is provided in the "In Seconds" column Rounded numbers are provided in the "In Minutes," "In Hours," "In Days," and "In Years" columns to more clearly illustrate the range of timespan relevance for each buffer.

The illustrated array of buffers has update times that are related according to a function that is based on a predefined update period for at least one of the buffers. The illustrated update periods are of particular usefulness in binary computing systems, wherein update period clocks/timers associated with each buffer may be easily embodied in simple and small countdown clocks (e.g. two seconds may use a single bit clock, four seconds uses a two bit clock, eight seconds uses a three bit clock, etc.). In particular, the function may be characterized as:

UpdatePeriod(n)=UpdatePeriod(n−1)×2, with UpdatePeriod(1)=1 second, OR may be characterized as Buffer n has a period of updating of (½ second)*$2^n$.

Other non-limiting exemplary functions may be:

UpdatePeriod(n)=UpdatePeriod(n−1)×10, with UpdatePeriod(1)=0.1 second;

UpdatePeriod(n)=UpdatePeriod(n−1)$^2$, with UpdatePeriod(1)=2 seconds;

UpdatePeriod(n)=UpdatePeriod(n−1)+UpdatePeriod(n−2), with UpdatePeriod(0)=1 second and Update Period(1)=2 seconds In operation, the memory buffer array copies the state of the Buffer(n−1) to Buffer (n) at the UpdatePeriod(n). Alternatively, the memory buffer array may perform a more complicated function at the update, such as but not limited to copying into Buffer(n) an average of the states stored in Buffer(n−1) during the update period, summing/appending/collating/etc. the state of Buffer(n−1) to that already stored in Buffer(n). Such more complicated functions may include other members of the array (e.g. Buffer(n−2)) and/or may include utilization and/or operation of other memory array buffers. Further, the UpdatePeriod function and/or the transfer function of an array of memory buffers may change between portions of the array. As a non-limiting example, there may be an array wherein Buffers 0-9 each have an update period of 1 second but 0-8 are offset by 0.1 seconds each (thereby spanning 0.1, 0.2, 0.3, etc. of each 1 second period) and Buffer 9 may update just one clock cycle after Buffer 8 and may have a transfer function that averages the state values found in each of Buffers 0-8. Buffers 10-X may then continue as illustrated in FIG. 7, matching Buffer 10 with the illustrated Buffer 2 and continuing as illustrated.

Accordingly, the state information stored in the buffer cascades downward into the array, providing a historical record of past states. A single computing unit (collaborative computing module) may include a plurality of memory buffer arrays that may be used to track a plurality of states and/or to track states in a plurality of manners (e.g. using different functions, transfer functions and/or different initial conditions).

In operation, the illustrated memory buffer array provides what may be called a cascading average (not a true averaging of actual values, but statistically likely to be the average or close to it) of state values of a particular state over a very large period of time (in the thousands of years). Accordingly, a computing unit having such an array could easily reverted to an "average" or exemplary state value that it had hundreds or even thousands of years prior, simply by copying the appropriate memory buffer into the current state of the computing unit. Wherein a program is developed using a plurality of such computing units, past states of the program may be easily recreated by mass reversion to prior exemplary state values as preserved by the associated array of memory buffers.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, while the present application discusses computing environments with visual/spatial components that operate within a physics-type engine of the computing environment, it is understood that such a system may include a visualization without a specific physics-type engine or without a physical modeling engine, that there may be a physics-type engine and/or a physical modeling engine without a corresponding visual representation, that there may be an audible, tactile (or other sensory) representation along with or instead of a visual representation, that the physics-type engine may include an n-dimensional Hilbert Space mapped to a set of n functions and/or data points, that a physics-type engine need not follow the laws of physics of our physical world, that a physics-type engine may snap atoms to grid points when they are placed/moved in a Hilbert Space, and/or that an engine that governs location and/or motion of atoms and/or modifies one or more characteristics of atoms may do so according to location in a Hilbert Space and/or that such location may be calculated absolutely, relative to other atoms and/or other features of the computing environment, combinations of and/or the like.

As another non-limiting example, function modules may include one or more functions and/or combinations thereof and/or one or more types of functions and/or functions contained therein may be changeable in real-time by users and/or by other atoms and/or information provided through a connecting strand(s).

As still another non-limiting example, there may be connecting strands that allow for visual programming by lay users to connect applications and/or or data streams together and such connecting strands may be "visualized" through audible, tactile or other sensory "display" to the user; that connecting strands may exist and operate within an n-dimensional Hilbert Space and may include and/or be associated with one or more of the dimensions of that space; that connecting strands may connect atoms within a single computing environment and/or between multiple environments; that connecting strands may couple atoms over computerized networks; that connecting strands may function only to transmit data; and/or that connecting strands may function only to cause association of characteristics of connected atoms and not transmit data otherwise.

Finally, memory storage in atoms may include memory of the memory; memory may include more gradients of memory than two (primary and secondary); relationships between associated memory units may be logarithmic, exponential, multiplicative, and/or the like and combinations thereof; and/or memory units may be functionally connected to other memory units, such as but not limited to one memory unit taking a calculated value from another memory unit one or more times. As a non-limiting example of functionally connected memory units, a memory unit may increment its stored value by a tenth of a value of an associated memory unit every unit of time until ten of those units have passed and then it may empty itself before incrementing on the eleventh/first operation and restart the process, thus building an ongoing average value of the associated unit every ten operations.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A programming system configured to facilitate the programming of computer programs, comprising:
   a) a computing system, including;
      i. a processing module including a processor;
      ii. a memory storage module including a memory device functionally coupled to the processor;
      iii. a plurality of collaborative computing modules stored in the memory device and functionally coupled to the processor, wherein each collaborative computing module includes a function and a plurality of state characteristics stored in memory;
      iv. a plurality of connection strand modules stored in the memory storage module and functionally coupled to the processing module, wherein each is configured to functionally couple collaborative computing modules together and to automatically operate on a first subset of the plurality of state characteristics according to a first predefined ruleset; and
      v. a physics engine module stored in the memory storage module and functionally coupled to the processing module, wherein the physics engine module automatically operates on a second subset of the plurality of state characteristics of the plurality of collaborative computing modules according to a second predefined ruleset;
   b) a display device, including a display module which displays on the display device the plurality of collaborative computing units in a visual representation according to a third subset of the plurality of state characteristics;
   c) a graphical user interface device, including an input module, configured to permit a user to manipulate the plurality of collaborative computing units and the plurality of connection strand modules within the computing system such that effective positions of collaborative computing units and connections therebetween may be determined by a user, thereby facilitating programming of the same; and
   wherein the display device updates its graphical representation of the plurality of collaborative computing units in real-time when a state characteristic of the third subset of the plurality of state characteristics is changed.

2. The system of claim 1, wherein first subset of the plurality of state characteristics, the second subset of the plurality of state characteristics and the third subset of the plurality of state characteristics all include overlapping characteristics.

3. The system of claim 1, wherein the collaborative computing modules also include an array of state memory buffers having escalating refresh periods that progressively store a history of state characteristics of the associated collaborative computing unit.

4. The system of claim 3, wherein the escalating refresh periods of the array of state memory buffers are related according to a logarithmic scale.

5. The system of claim 4, further comprising a reversion module configured to select a memory buffer level from the array of state memory buffers and cause a plurality of collaborative computing units to revert to the state characteristics stored at that memory buffer level.

6. The system of claim 1, wherein the second predefined ruleset includes a rule biasing position of collaborative computing modules towards a point along an axis displayed on the display device.

7. The system of claim 1, wherein the second predefined ruleset includes a rule biasing position of collaborative computing modules in favor of a preferred length of a connecting strand module coupling such collaborative computing modules.

8. The system of claim 1, wherein the function is selected from the group of functions consisting of: storing information, performing a Boolean operation, transmitting information, comparing information, changing an internal state characteristic, changing a state characteristic of another collaborative computing module, changing a state characteristic of a connection strand module, creating a collaborative computing module, creating a connection strand module, and changing a characteristic of a physics engine module.

9. The system of claim 1, wherein a change in one of the second subset of state characteristics modifies operation of a function of at least one of the collaborative computing modules.

10. The system of claim 1, wherein the plurality of state characteristics includes a characteristic from the group of characteristics consisting of: a time period utilized by a function, a unique identifier of a collaborative computing module, a unique identifier of a connection strand module, an active/inactive toggle value, and a data value utilized by a function.

11. The system of claim 1, wherein the plurality of connection strand modules transmit data between connected collaborative computing modules.

12. The system of claim 1, wherein the third subset of the plurality of characteristics is an n-dimensional Hilbert space mapped to a set of functions, displayed by the display device and operated upon by the physics engine module.

13. The system of claim 1, wherein at least one of the physics engine module and a connection strand module of the plurality of connection strand modules operates in real-time.

14. A system of computing over a network, comprising:
a) a plurality of collaborative computing modules operating through a processor and stored in a plurality of memory devices that are non-transitory storage mediums over a network and functionally coupled to a plurality of processors over a network, wherein each collaborative computing module includes a function, an array of state memory buffers having escalating refresh periods that progressively store a history of state characteristics of the associated collaborative computing unit, and a plurality of state characteristics stored in memory;
b) a plurality of connection strand modules functionally coupled to the plurality of collaborative computing modules, wherein each is configured to functionally couple collaborative computing modules together and to automatically operate on a first subset of the plurality of state characteristics according to a first predefined ruleset;
c) a physics engine module including a processor functionally coupled to the plurality of collaborative computing modules that automatically operates on a second subset of the plurality of state characteristics of the plurality of collaborative computing modules according to a second predefined ruleset; and
d) a display device, including a display module which displays on the display device the plurality of collaborative computing units in a visual representation according to a third subset of the plurality of state characteristics, wherein the third subset of characteristics is an n-dimensional Hilbert space mapped to a set of functions, displayed by the display device and operated upon by the physics engine module.

15. A method of computing, comprising the steps of:
a) recording a first state characteristic value of a plurality of state characteristics of a collaborative computing module in a progressive array of non-transitory, tangible memory buffers, wherein the collaborative computing module includes a function and a plurality of state characteristics stored in memory;
b) modifying the first state characteristic, wherein the modified first state characteristic changes operation of the function;
c) automatically changing, by operation of a processor in cooperation with a display device, a graphical representation of the collaborative computing module according to the modification of first state characteristic;
d) recording the modified state characteristic in the progressive array of non-transitory, tangible memory buffers;
wherein the function is selected from the group of functions consisting of: storing information, performing a Boolean operation, transmitting information, comparing information, changing an internal state characteristic, changing a state characteristic of another collaborative computing module, changing a state characteristic of a connection strand module, creating a collaborative computing module, creating a connection strand module, and changing a characteristic of a physics engine module; and
wherein the plurality of state characteristics includes a characteristic from the group of characteristics consisting of: a time period utilized by a function, a unique identifier of a collaborative computing module, a unique identifier of a connection strand module, an active/inactive toggle value, and a data value utilized by a function.

16. The method of claim 15, wherein the step of modifying the first state characteristic occurs automatically as a consequence of at least one of coupling a connection strand module to the collaborative computing module, operation of a physics engine module on the collaborative computing module, and a user, through operation of an input device, selectably altering an intended graphical representation of the collaborative computing module.

17. A method of programming, comprising the steps of:
a) generating a first collaborative computing module within a computing system, wherein the collaborative computing module includes a function and a plurality of state characteristics stored in memory;
b) generating a second collaborative computing module within the computing system, wherein the collaborative computing module includes a function and a plurality of state characteristics stored in memory;
c) generating a connection strand module within the computing system, the connection strand module being configured to functionally couple collaborative computing modules together;
d) determining one or more state characteristics of each of the first and second collaborative computing modules by placing graphical representations of each of the first and second collaborative computing modules in virtual locations within an n-dimensional Hilbert space displayed on a display device; and
e) functionally coupling the first and second collaborative computing modules by connecting a graphical representation of the connection strand module on the display device to each of the graphical representations of the first and second collaborative computing modules.

18. A non-transitory, tangible computer readable storage medium including executable instructions for a programming environment, the instructions performing the steps of:
a) generating a first collaborative computing module within a computing system, wherein the collaborative computing module includes a function and a plurality of state characteristics stored in memory;
b) generating a second collaborative computing module within the computing system, wherein the collaborative computing module includes a function and a plurality of state characteristics stored in memory;
c) generating a connection strand module within the computing system, the connection strand module being configured to functionally couple collaborative computing modules together;
d) determining one or more state characteristics of each of the first and second collaborative computing modules by placing graphical representations of each of the first and second collaborative computing modules in virtual locations within an n-dimensional Hilbert space displayed on a display device; and
e) functionally coupling the first and second collaborative computing modules by connecting a graphical representation of the connection strand module on the display device to each of the graphical representations of the first and second collaborative computing modules.

* * * * *